United States Patent
Khoury et al.

(10) Patent No.: US 10,679,630 B2
(45) Date of Patent: Jun. 9, 2020

(54) SPEAKER RECOGNITION IN THE CALL CENTER

(71) Applicant: PINDROP SECURITY, INC., Atlanta, GA (US)

(72) Inventors: Elie Khoury, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 16/442,368

(22) Filed: Jun. 14, 2019

(65) Prior Publication Data

US 2019/0304468 A1 Oct. 3, 2019

Related U.S. Application Data

(63) Continuation of application No. 15/709,290, filed on Sep. 19, 2017, now Pat. No. 10,325,601.

(60) Provisional application No. 62/396,670, filed on Sep. 19, 2016.

(51) Int. Cl.

| | |
|---|---|
| *G10L 17/00* | (2013.01) |
| *H04M 1/27* | (2006.01) |
| *G10L 17/24* | (2013.01) |
| *G10L 15/19* | (2013.01) |
| *G10L 17/08* | (2013.01) |
| *G06N 7/00* | (2006.01) |
| *G10L 15/07* | (2013.01) |

(Continued)

(52) U.S. Cl.
CPC ............ *G10L 17/005* (2013.01); *G06N 7/005* (2013.01); *G10L 15/07* (2013.01); *G10L 15/19* (2013.01); *G10L 15/26* (2013.01); *G10L 17/04* (2013.01); *G10L 17/08* (2013.01); *G10L 17/24* (2013.01); *H04M 1/271* (2013.01); *H04M 2203/40* (2013.01)

(58) Field of Classification Search
CPC ......... G10L 15/00; G10L 15/06; G10L 15/26; G10L 17/00; G10L 17/06; G10L 17/20; G10L 25/51; G10L 25/78
See application file for complete search history.

(56) References Cited

U.S. PATENT DOCUMENTS

| | | |
|---|---|---|
| 4,817,156 A | 3/1989 | Bahl et al. |
| 4,829,577 A | 5/1989 | Kuroda et al. |
| 4,972,485 A | 11/1990 | Dautrich et al. |

(Continued)

OTHER PUBLICATIONS

Snyder, D., Garcia-Romero, D., & Povey, D. Time delay deep neural network-based universal background models for speaker recognition. In 2015 IEEE Workshop on Automatic Speech Recognition and Understanding (ASRU) (pp. 92-97). IEEE, (2015). (Year: 2015).*

(Continued)

*Primary Examiner* — Edgar X Guerra-Erazo
(74) *Attorney, Agent, or Firm* — Foley & Lardner LLP

(57) ABSTRACT

Utterances of at least two speakers in a speech signal may be distinguished and the associated speaker identified by use of diarization together with automatic speech recognition of identifying words and phrases commonly in the speech signal. The diarization process clusters turns of the conversation while recognized special form phrases and entity names identify the speakers. A trained probabilistic model deduces which entity name(s) correspond to the clusters.

20 Claims, 12 Drawing Sheets

(51) Int. Cl.
*G10L 15/26* (2006.01)
*G10L 17/04* (2013.01)

(56) References Cited

U.S. PATENT DOCUMENTS

| | | |
|---|---|---|
| 5,072,452 A | 12/1991 | Brown et al. |
| 5,475,792 A | 12/1995 | Stanford et al. |
| 5,835,890 A | 11/1998 | Matsui et al. |
| 5,995,927 A | 11/1999 | Li |
| 6,009,392 A | 12/1999 | Kanevsky et al. |
| 6,055,498 A | 4/2000 | Neumeyer et al. |
| 6,094,632 A | 7/2000 | Hattori |
| 6,141,644 A | 10/2000 | Kuhn et al. |
| 6,411,930 B1 | 6/2002 | Burges |
| 6,463,413 B1 | 10/2002 | Applebaum et al. |
| 6,519,561 B1 | 2/2003 | Farrell et al. |
| 6,760,701 B2 | 7/2004 | Sharma et al. |
| 6,882,972 B2 | 4/2005 | Kompe et al. |
| 6,922,668 B1 | 7/2005 | Downey |
| 7,003,460 B1 | 2/2006 | Bub et al. |
| 7,209,881 B2 | 4/2007 | Yoshizawa et al. |
| 7,318,032 B1 | 1/2008 | Chaudhari et al. |
| 7,324,941 B2 | 1/2008 | Choi et al. |
| 7,813,927 B2 | 10/2010 | Navratil et al. |
| 8,160,877 B1 | 4/2012 | Mucci et al. |
| 8,484,023 B2 | 7/2013 | Kanevsky et al. |
| 8,484,024 B2 | 7/2013 | Kanevsky et al. |
| 8,554,563 B2 | 10/2013 | Aronowitz |
| 8,712,760 B2 | 4/2014 | Hsia et al. |
| 8,886,663 B2 | 11/2014 | Gainsboro et al. |
| 8,903,859 B2 | 12/2014 | Zeppenfeld et al. |
| 9,042,867 B2 | 5/2015 | Gomar |
| 9,336,781 B2 | 5/2016 | Scheller et al. |
| 9,343,067 B2 | 5/2016 | Ariyaeeinia et al. |
| 9,355,646 B2 | 5/2016 | Oh et al. |
| 9,373,330 B2 | 6/2016 | Cumani et al. |
| 9,401,143 B2 | 7/2016 | Senior et al. |
| 9,401,148 B2 | 7/2016 | Lei et al. |
| 9,406,298 B2 | 8/2016 | Cumani et al. |
| 9,431,016 B2 | 8/2016 | Aviles-Casco et al. |
| 9,454,958 B2 | 9/2016 | Li et al. |
| 9,460,722 B2 | 10/2016 | Sidi et al. |
| 9,502,038 B2 | 11/2016 | Wang et al. |
| 9,514,753 B2 | 12/2016 | Sharifi et al. |
| 9,558,755 B1 | 1/2017 | Laroche et al. |
| 9,584,946 B1 | 2/2017 | Lyren et al. |
| 9,620,145 B2 | 4/2017 | Bacchiani et al. |
| 9,626,971 B2 | 4/2017 | Rodriguez et al. |
| 9,633,652 B2 | 4/2017 | Kumiawati et al. |
| 9,665,823 B2 | 5/2017 | Saon et al. |
| 9,685,174 B2 | 6/2017 | Karam et al. |
| 9,875,739 B2 | 1/2018 | Ziv et al. |
| 9,875,742 B2 | 1/2018 | Gorodetski et al. |
| 9,875,743 B2 | 1/2018 | Gorodetski et al. |
| 9,881,617 B2 | 1/2018 | Sidi et al. |
| 9,984,706 B2 | 5/2018 | Wein |
| 10,325,601 B2 * | 6/2019 | Khoury .................. G10L 17/24 |
| 2002/0095287 A1 | 7/2002 | Botterweck |
| 2002/0143539 A1 | 10/2002 | Botterweck |
| 2004/0218751 A1 | 11/2004 | Colson et al. |
| 2004/0230420 A1 | 11/2004 | Kadambe et al. |
| 2005/0038655 A1 | 2/2005 | Mutel et al. |
| 2005/0039056 A1 | 2/2005 | Bagga et al. |
| 2006/0111905 A1 | 5/2006 | Navratil et al. |
| 2007/0198257 A1 | 8/2007 | Zhang |
| 2007/0294083 A1 | 12/2007 | Bellegarda et al. |
| 2008/0195389 A1 | 8/2008 | Zhang et al. |
| 2008/0312926 A1 | 12/2008 | Vair et al. |
| 2010/0131273 A1 | 5/2010 | Aley-Raz et al. |
| 2011/0010173 A1 | 1/2011 | Scott et al. |
| 2013/0080165 A1 | 3/2013 | Wang et al. |
| 2013/0300939 A1 | 11/2013 | Chou et al. |
| 2014/0337017 A1 | 11/2014 | Watanabe et al. |
| 2015/0127336 A1 | 5/2015 | Lei et al. |
| 2015/0161522 A1 | 6/2015 | Saon et al. |
| 2016/0019883 A1 | 1/2016 | Aronowitz |
| 2016/0078863 A1 | 3/2016 | Chung et al. |
| 2016/0240190 A1 | 8/2016 | Lee et al. |
| 2016/0275953 A1 | 9/2016 | Sharifi et al. |
| 2016/0284346 A1 | 9/2016 | Visser et al. |
| 2016/0343373 A1 | 11/2016 | Ziv et al. |
| 2017/0069313 A1 | 3/2017 | Aronowitz |
| 2017/0098444 A1 | 4/2017 | Song |
| 2018/0082691 A1 | 3/2018 | Khoury et al. |

OTHER PUBLICATIONS

Ahmad, K. S., Thosar, A. S., Nirmal, J. H., & Pande, V. S. A unique approach in text independent speaker recognition using MFCC feature sets and probabilistic neural network. In 2015 Eighth International Conference on Advances in Pattern Recognition (ICAPR) (pp. 1-6). IEEE, (2015). (Year: 2015).*

Baraniuk, R.G., "Compressive Sensing [Lecture Notes]", IEEE Signal Processing Magazine, vol. 24, Jul. 2007, pp. 1-9.

Cumani, S., et al., "Factorized Sub-space Estimation for Fast and Memory Effective i-Vector Extraction", IEEE/ACM TASLP, vol. 22 Issue 1, Jan. 2014, pp. 248-259.

Dehak et al., "Front-end Factor Analysis for Speaker Verification", IEEE TASLP, vol. 19, No. 4, May 2011, 11 pages.

Gao, J. et al., "Dimensionality Reduction via Compressive Sensing", Pattern Recognition Letters 33, Elsevier Science BV 0167-8655, 2012.

Ghahabi Omid et al., "Restricted Boltzmann Machine Supervectors for Speaker Recognition," 2015 IEEE International Conference on Acoustics, Speech and Signal Processing (ICASSP), IEEE, Apr. 19, 2015. pp. 4804-4808, XP033187673.

Kenny P. "A Small Footprint i-Vector Extractor" Proc. Odyssey Speaker and Language Recognition Workshop, Singapore, Jun. 25, 2012.

Lei et al., "A Novel Scheme for Speaker Recognition Using a Phonetically-aware Deep Neural Network", Proceedings on ICASSP. Florence, Italy:IEEE Press, 2014:1695-1699.

Szu-Wei Fu et al., "SNR-Aware Convolutional Neural Network Modeling for Speech Enhancement", Interspeech 2016, vol. 2016, Sep. 8, 2016, pp. 3768-3772, XP055427533.

Xu, L., et al. "Rapid Computation of i-Vector" Odyssey, Bilbao, Spain, Jun. 21-34, 2016.

Garcia-Romero et al., "Unsupervised Domain Adaptation for i-vector Speaker Recognition," Odyssey 2014, pp. 260-264.

Khoury et al., "Combining transcription-based and acoustic-based speaker identifications for broadcast news," ICASSP, Kyoto, Japan, 2012, pp. 4377-4380.

Khoury et al., "Hierarchical speaker clustering methods for the NIST i-vector challenge," Odyssey 2014, pp. 254-259.

Schmidt, et al., "Large-scale speaker identification," ICASSP, 2014, pp. 1650-1654.

Anguera, et al. "Partial sequence matching using an Unbounded Dynamic Time Warping algorithm." IEEE ICASSP, Apr. 2010, pp. 3582-3585.

International Search Report and Written Opinion in corresponding PCT Application PCT/US2017/052335, dated Dec. 8, 2017, 10 pages.

Scheffer et al., "Content matching for short duration speaker recognition", INTERSPEECH, Sep. 14-18, 2014, pp. 1317-1321.

Sturim et al., "Speaker Linking and Applications Using Non-Parametric Hashing Methods," Interspeech, Sep. 2016, 5 pages.

Prince, S., et al. "Probabilistic, Linear Discriminant Analysis for Inferences about Identity," Proceedings of the International Conference on Computer Vision, Oct. 14-21, 2007.

Richardson, F. et al., "Speaker Recognition Using Real vs Synthetic Parallel Data for DNN Channel Compensation", INTERSPEECH, 2016.

Richardson, F., et al., "Deep Neural Network Approaches to Speaker and Language Recognition", IEEE Signal Processing Letters, vol. 22, No. 10, Oct. 2015, pp. 1671-1675.

(56) References Cited

OTHER PUBLICATIONS

Richardson, F., et al., "Channel Compensation for Speaker Recognition using Map Adapted PLDA and Denoising DNNs", Proc. Speaker Lang. Recognit. Workshop, Jun. 22, 2016, pp. 225-230.
Solomonoff, A., et al. "Nuisance Attribute Projection", Speech Communication, Elsevier Science by, Amsterdam, The Netherlands. May 1, 2007.
Zhang et al. "Extracting Deep Neural Network Bottleneck Features using Low-rank Matrix Factorization", IEEE ICASSP, 2014.
McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.
Zheng et al. An experimental study of speech emotion recognition based on deep convolutional neural networks; 2015 International Conference on Affective Computing & Intelligent Interaction (ACII); pp. 827-831. (Year: 2015).
Zheng et al. "Extracting Deep Neural Network Bottleneck Features using Low-rank Matrix Factorization", IEEE ICASSP, 2014.
W.Q. Zheng et al., An experimental study of speech emotion recognition based on deep convolutional neural networks 2015 International Conference on Affective Computing & Intelligent Interaction (ACII); pp. 827-831 (Year 2015).

\* cited by examiner

```
I = { (1,1), (1,2), (2,1) }
S = M = D_g = zeros(d1,d2)
for m = 0, 1, ..., d1; do
  for n = 0, τ_h, 2τ_h, ..., d2; do
    S(m,n) = Dg(m,n)= cos(U1(m,:), U2(n,:))
    M(m,n) = 1 for m = 0, ..., d1-2; do
  for n = 0,..., d2-2; do
    if M(m,n) ≠ 0:
      for i,j in I:
        if S(m+i,n+j) == 0:
          S(m+i,n+j) = cos(U1(m+i,:), U2(n+j,:))
        p1 = (D_g(m,n) + S(m+i, n+)]) / (M(m,n) + 1)
        if D_g(m+i,n+j) > 1; then
          p2 = D_g(m+i, n+j) / M(m+i, n+j)
        else:
          p2 = 0
        if p1 > p2 and p1 > Thr:
          M(m+i, n+j) = M(m,n) + 1
          D_g(m+i, n+j) = D_g(m,n) + S(m+i, n+j)
score = Max(M)
```

SPEAKER RECOGNITION IN THE CALL CENTER

CROSS-REFERENCE TO RELATED APPLICATIONS

This application is continuation of U.S. patent application Ser. No. 15/709,290, filed Sep. 19, 2017, which claims priority to U.S. Provisional Application No. 62/396,670, filed 19 Sep. 2016, each of which has been incorporated by reference in its entirety.

TECHNICAL FIELD

This application is related to methods and systems for audio processing, and more particularly to audio processing for speaker identification and verification.

BACKGROUND

Automatic speaker recognition aims to recognize people from their voices. Two standards of speaker recognition are verification and identification. The former is a 1-to-1 problem, in which the claimed identity of one speaker is verified based on previous samples provided by that speaker alone to verify an alleged identity of the speaker. The latter (identification) is a 1-to-N problem in which a speaker is evaluated against previously obtained models (also known as voiceprints or embedments) of multiple speakers in order to identify which speaker out of the N known speakers produced a particular received test sample.

Speaker identification (the 1-to-N problem) can be addressed in closed-set or open-set conditions. Closed-set identification results in identifying a speaker among known speakers. In contrast, open-set identification considers not only whether the speaker is one of the N speakers, but also if it is an unknown speaker. Both the verification and identification scenarios are important in a call center.

Speaker verification is used to authenticate a genuine known user by comparing his current voice with the voice on file for that user, while speaker identification can be used to detect a potential fraudster whose voice exists in a blacklist of the call center.

In some implementations, speaker recognition is text-dependent—which usually requires active enrollment of a speaker by asking the speaker to repeat a prompted pass-phrase—or text-independent, which is typical of passive recognition.

A less widely known use case of speaker recognition technology is anomaly detection, where the objective of the recognition is to detect possible fraud activities by using an incoherence between (a) voiceprint similarities and (b) available metadata such as automatic number identification (ANI) or account number (e.g., a caller's account at a bank serviced by the call center).

The inventors have devised several methods to improve call center operations using speaker recognition in novel ways.

SUMMARY

The presently claimed inventions are directed to a methods and apparatuses for use in, for example, a call center to identify speakers (e.g., an agent and caller) in a recorded or live conversation and to associate the identified speaker with their respective conversation portions.

In an exemplary embodiment, speakers in a speech signal may be distinguished and identified by obtaining the speech signal at an input, the speech signal including utterances respectively from at least a first speaker and a second speaker; extracting speech portions from the speech signal; performing speaker diarization on the speech portions, the speaker diarization identifying speech portions respectively associated with at least one of the first speaker and the second speaker; detecting at least one trigger phrase in the respective speech portions by using automatic speech recognition, each possible trigger phrase being associated with a respective prior probability that a current, next or previous utterance in the respective speech portion is an entity name; detecting at least one entity name in the respective speech portions by using automatic speech recognition; and employing a probabilistic model trained to associate at least one of the first speaker and the second speaker with a respective one of the at least one detected entity names, the probabilistic model being trained based on at least the diarized speech portions, the detected at least one trigger phrase, and the detected at least one named entity.

In an exemplary embodiment, the probabilistic model is a Bayesian network.

In an exemplary embodiment, the speaker diarization identifies speech portions respectively associated with each of the first speaker and the second speaker; and the probabilistic model is trained to associate each of the first speaker and the second speaker with a respective one of the detected entity names.

In an exemplary embodiment, performing the speaker diarization includes: periodically extracting i-vectors from the speech portions; and partitional clustering the i-vectors into respective clusters for the first speaker and the second speaker, wherein the probabilistic model associates an identification of at least one of the first speaker and the second speaker with a corresponding one of the respective clusters.

In an exemplary embodiment the first speaker is a call center agent, and the second speaker is a caller.

In an exemplary embodiment, an apparatus for distinguishing and identifying at least one of multiple speakers in a speech signal includes an input, a speech activity detector, a speaker diarization processor, an automatic speech recognition (ASR) processor, and a probabilistic model. The input is configured to receive a speech signal having utterances from at least a first speaker and a second speaker. The speech activity detector is configured to extract speech portions of the speech signal. The speaker diarization processor segregates the extracted speech portions into speech portions associated with at least one of the first speaker and the second speaker. The automatic speech recognition processor recognizes one or more predetermined trigger phrases in each speech portion, each possible trigger phrase being associated with a respective prior probability that a current, next or previous utterance in the respective speech portion is a named entity and to recognized one or more entity names each respective speech portion. The probabilistic model is trained to associate a recognized entity name with speech portions associated with at least one of the first speaker and the second speaker.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

FIGURES

FIG. 4B shows a modified dynamic time warping (DTW) algorithm according to an exemplary embodiment disclosed herein.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

A general overview of a speaker recognition system is presented first, followed by detailed description disclosing methods and apparatus for improving call center operations using speaker recognition. The inventors envision that various embodiments disclosed herein may be implemented separately, in parallel use, and/or in combinations that beneficially share resources, structure or function. It will be appreciated that not all combinations are explicitly detailed herein.

Figure 1:
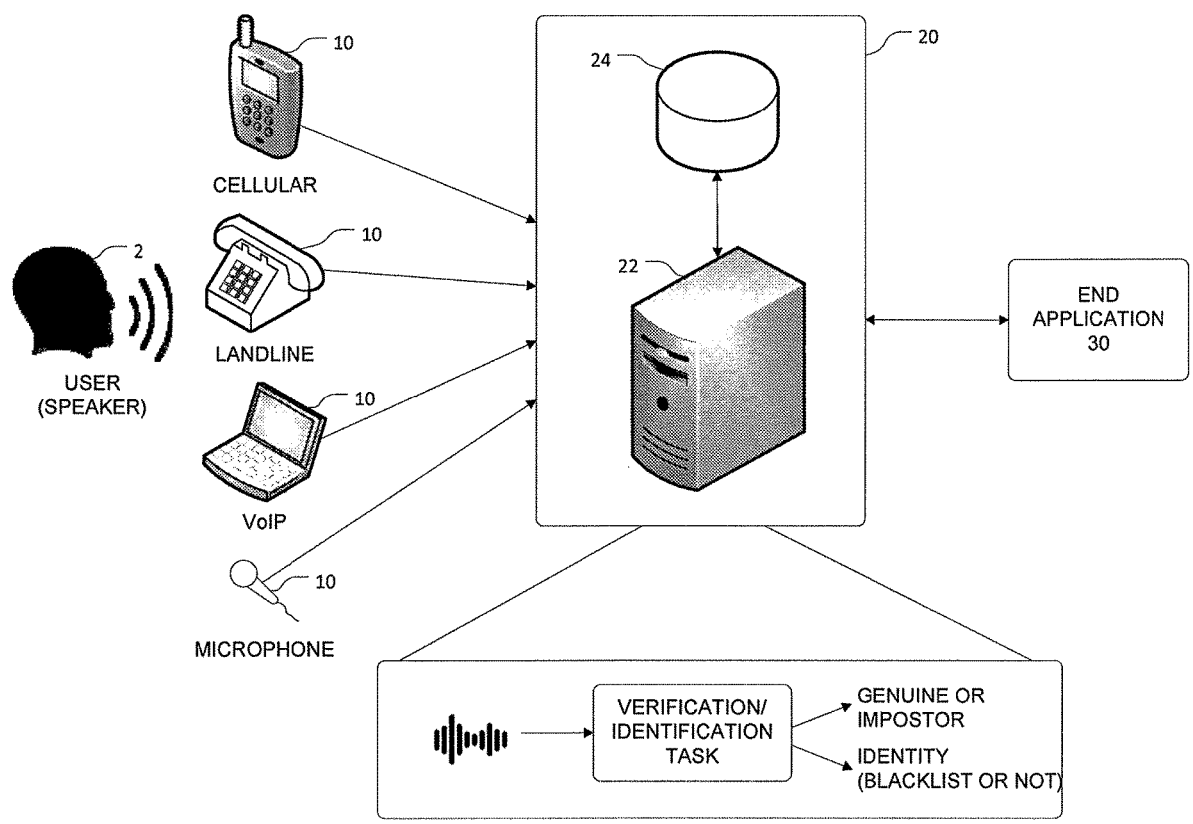
FIG. 1 is a block diagram illustrating a system for performing speaker recognition according to an exemplary embodiment of the present disclosure.

FIG. 1 is a block diagram that illustrates a system for performing speaker recognition according to an exemplary embodiment of the present invention. According to FIG. 1, a user or speaker 2 may speak an utterance into input device 10 containing an audio acquisition device, such as a microphone, for converting the uttered sound into an electrical signal. As particularly shown in FIG. 1, the input device 10 may be a device capable of telecommunications, such as a telephone (either cellular or landline) or a computer or other processor based device capable of voice over internet (VoIP) communications. In fact, it is contemplated that the present invention could be utilized specifically in applications to protect against, for example, telephone fraud, e.g., verifying that the caller is whom he/she claims to be, or detecting the caller's identity as somebody on a "blacklist" or "blocked callers list." Although it is contemplated that the input device 10 into which the recognition speech signal is spoken may be a telecommunication device (e.g., phone), this need not be the case. For instance, the input device 10 may simply be a microphone located in close proximity to the speaker recognition subsystem 20. In other embodiments, the input device 10 may be located remotely with respect to the speaker recognition subsystem.

According to FIG. 1, the user's utterance, which is used to perform speaker identification, will be referred to in this specification as the "recognition speech signal." The recognition speech signal may be electrically transmitted from the input device 10 to a speaker recognition subsystem 20.

The speaker recognition subsystem 20 of FIG. 1 may include a computing system 22, which can be a server or a general-purpose personal computer (PC). The computing system 22 may be programmed to implement the various inventive methods disclosed herein. In some embodiments, the computing system 22 may be programmed to model a deep neural network in conjunction with the inventive techniques disclosed herein.

It should be noted, however, that the computing system 22 is not strictly limited to a single device, but instead may comprise multiple computers and/or devices working in cooperation to perform the operations described in this specification. While single or multiple central processing units (CPU) may be used as a computing device both for training and testing, graphics processing units (GPU's) may also be used. For instance, the use of a GPU in the computing system 22 may help reduce the computational cost, especially during training. Furthermore, the computing system may be implemented in a cloud computing environment using a network of remote servers.

As shown in FIG. 1, the speaker recognition subsystem 20 may also include a memory device 24 that may store program instructions for implementing the various inventive techniques. Particularly, this memory device 24 may contain a plurality of raw and/or sampled speech signals (or "speech samples") from multiple users or speakers, as well as a plurality of registered voiceprints (or "speaker models") obtained for users who have been "enrolled" into the speaker registration subsystem 20.

Referring again to FIG. 1, the results of the speaker recognition analysis can be used by an end application 30 that needs to authenticate the caller (i.e., user), i.e., verifying that the caller is whom he/she claims to be by using the testing functions described herein. As an alternative, the end application 30 may need to identify any caller who is on a predefined list (e.g., blacklist or blocked callers; or whitelist, approved callers). This can help detect a malicious caller who spoofs a telephone number to evade detection by calling line identification (CLID) (sometimes referred to as "Caller ID"). However, even though the present invention can be used by applications 30 designed to filter out malicious callers or verify approved callers, the present invention is not limited to those types of applications 30.

For instance, the present invention can be advantageously used in other applications 30, e.g., where voice biometrics are used to unlock access to a room, resource, etc. Furthermore, the end applications 30 may be hosted on a computing system as part of computing system 20 itself or hosted on a separate computing system similar to the one described above for computing system 20. The end application 30 may be also implemented on a (e.g., remote) terminal with the computing system 20 acting as a server. As another specific example, the end application 30 may be hosted on a mobile device such as a smart phone that interacts with computing system 20 to perform authentication using the testing functions described herein.

It should be noted that various modifications can be made to the system illustrated in FIG. 1. For instance, the input device 10 may transmit the recognition speech signal directly to the end application 30, which in turn relays the recognition speech signal to the speaker recognition subsystem 20. In this case, the end application 30 may also receive some form of input from the user representing a self-identification. For instance, in case of performing a speaker identification task, the end application 30 may request the user to identify him or herself (either audibly or by other forms of input), and send both the recognition speech signal and the user's alleged identity to the speech recognition subsystem 20 for authentication. In other cases, the self-identification of the user may consist of the user's alleged telephone number, as obtained by CLID. Furthermore, there is no limitation in regard to the respective locations of the various elements illustrated in FIG. 1. In certain situations, the end application 30 may be remote from the user, thus requiring the use of telecommunications for the user to interact with the end application 30. Alternatively, the user (and the input device 10) may be in close proximity to the end application 30 at the time of use, e.g., if the application 30 controls a voice-activated security gate, etc.

Figure 2:
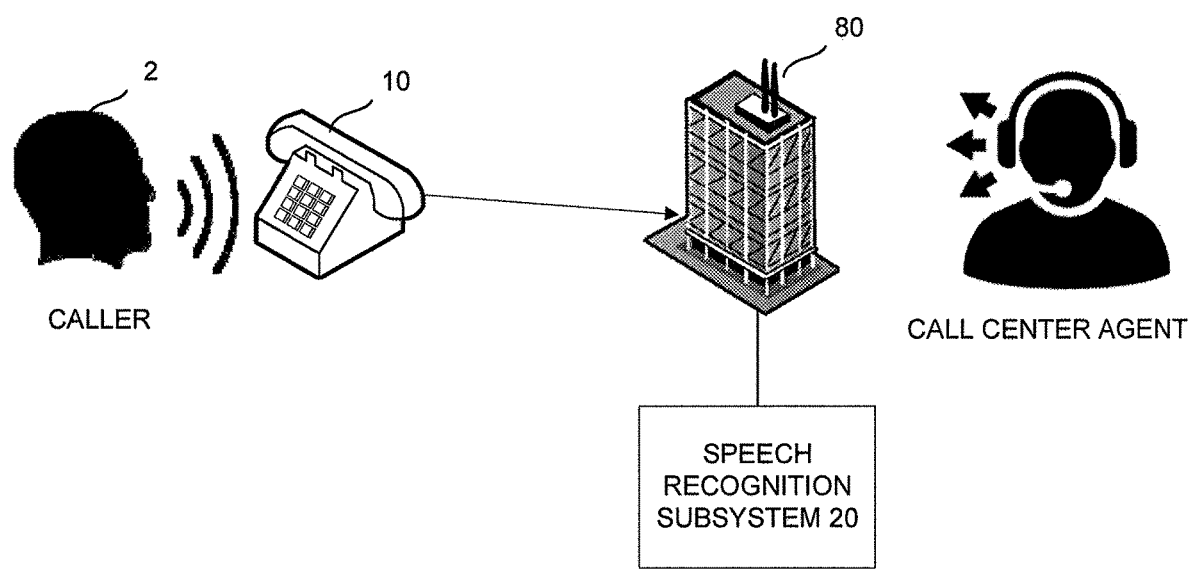
FIG. 2 illustrates a call center implementing a speech recognition system according to exemplary embodiments disclosed herein.

FIG. 2 illustrates a call center 80 implementing a speaker recognition subsystem 20. A caller 2 may contact the call center 80 to speak with a call center agent. A speech signal of at least the caller 2 may be provided by an audio capture device 10 such as a telephone, and captured and processed by the speaker recognition subsystem 20. In some instances, the call center 80 may include a speech signal of the call center agent.

A speaker recognition system such as the speaker recognition subsystem 20 described above may implement embodiments disclosed below in, e.g., a call center or collection of call centers to provide new security features or improve existing ones, to provide improved services to call center patrons, to help reduce fraud, and to provide other benefits. It will be recognized by those having skill in the art, that the embodiments disclosed herein need not be limited to call centers, and may instead be applied to other circumstances where, for example, callers are serviced in high volume, fraudulent callers may persist, and the like. Five categories of improvements are described in detail below but it is to be understood that at least some of these categories may be combined.

I. Partial Sequence Matching for Passive Speaker Recognition

Conventional passive voice recognition applications use text-independent acoustic speaker recognition systems. Those systems study the similarity between enrolment speech and test speech in the acoustic domain. However, such systems do not benefit from the similarity in content of both enrollment and test utterances, like text-dependent speaker recognition does, where a known or prompted passphrase is spoke by the user. In this case, both phonetic and acoustic factors are taken into account by the system.

Partial sequence matching for has been studied for acoustic keyword spotting. For instance, a same keyword may be expected in, and retrieved from, all speech utterances in certain settings. For example a call center for a financial institution may ask every inbound caller to state his/her name, address, account number, etc. Previous studies have described an "unbounded dynamic time warping" (UDTW) algorithm that works independently of the starting point of the keyword in the utterance. (See, Anguera, et al., "Partial Sequence Matching using an Unbounded Dynamic Time Warping Algorithm", IEEE ICASSP, 2010.) However, this technique is speaker independent. While speaker independence may be desirable in some settings (e.g., speech recognition), it is antithetical to the notion of speaker recognition.

Other studies have proposed a content-matching approach for speaker recognition. Such approaches utilize a phonetically-aware DNN system. (See Scheffer, et al., "Content Matching for Short Duration Speaker Recognition", INTERSPEECH, 2014; see also, U.S. Pat. No. 9,336,781 to Scheffer, et al.) However, such system is computationally very expensive as it requires training a DNN background model and using it to compute the required zero-order Baum-Welch statistics at both the enrollment and test time.

One of the approaches disclosed herein takes advantage of speaker dependence and presents a significant decrease in computational complexity, thus realizing a decrease in cost and an increase of efficiency. While speaker independence may be desirable in some settings, the present inventors have recognized an alternative approach that focuses on both the content and the speaker identity. Moreover, the disclosed partial sequence content matching does not require any background model and has lower CPU and memory footprint.

Figure 3:
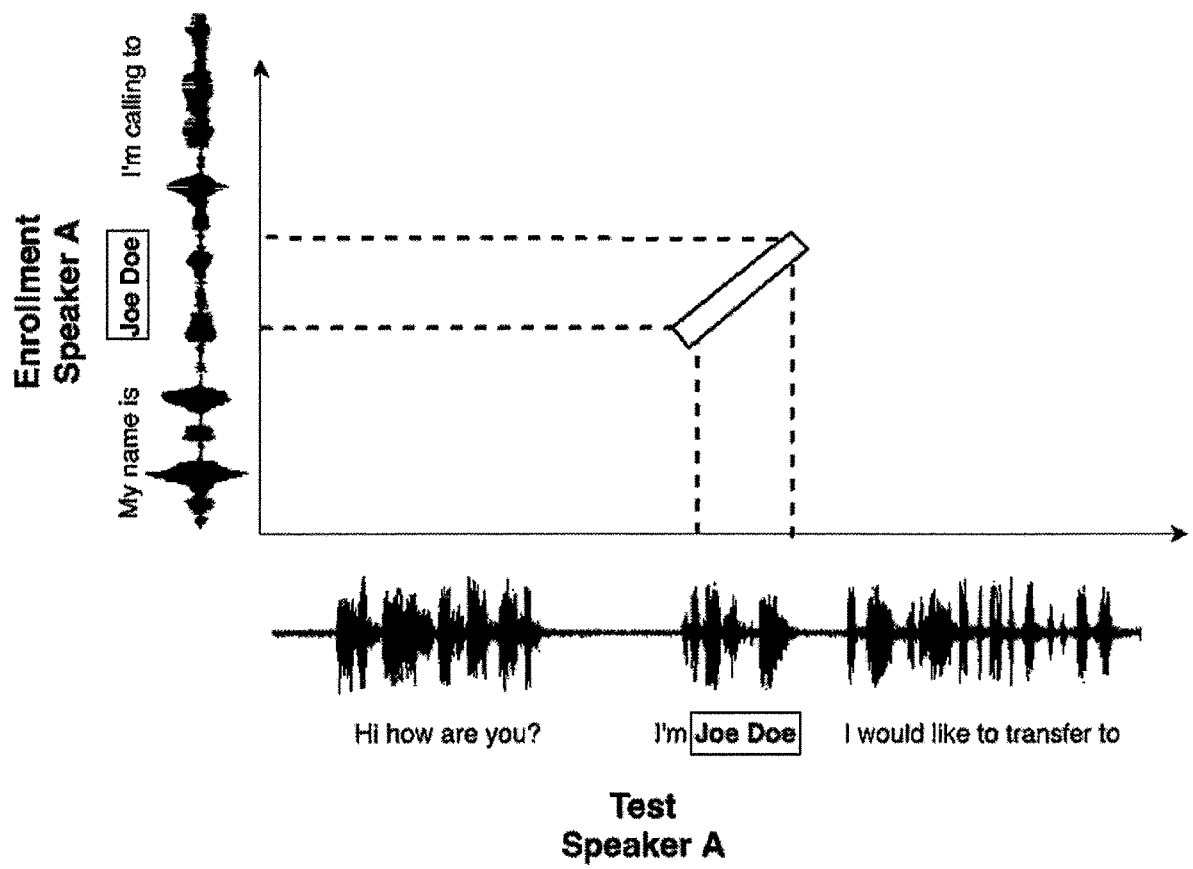
FIG. 3 illustrates a graph showing a test speech sample and an enrollment speech sample according to an exemplary embodiment herein described.

FIG. 3 illustrates a graph showing a test speech sample and an enrollment speech sample each containing a repeated phrase. A speaker may naturally (or can be prompted to) repeat particular words (e.g. "Joe Doe" in FIG. 3) every time he calls his financial institution or his insurance company.

Figure 4A:
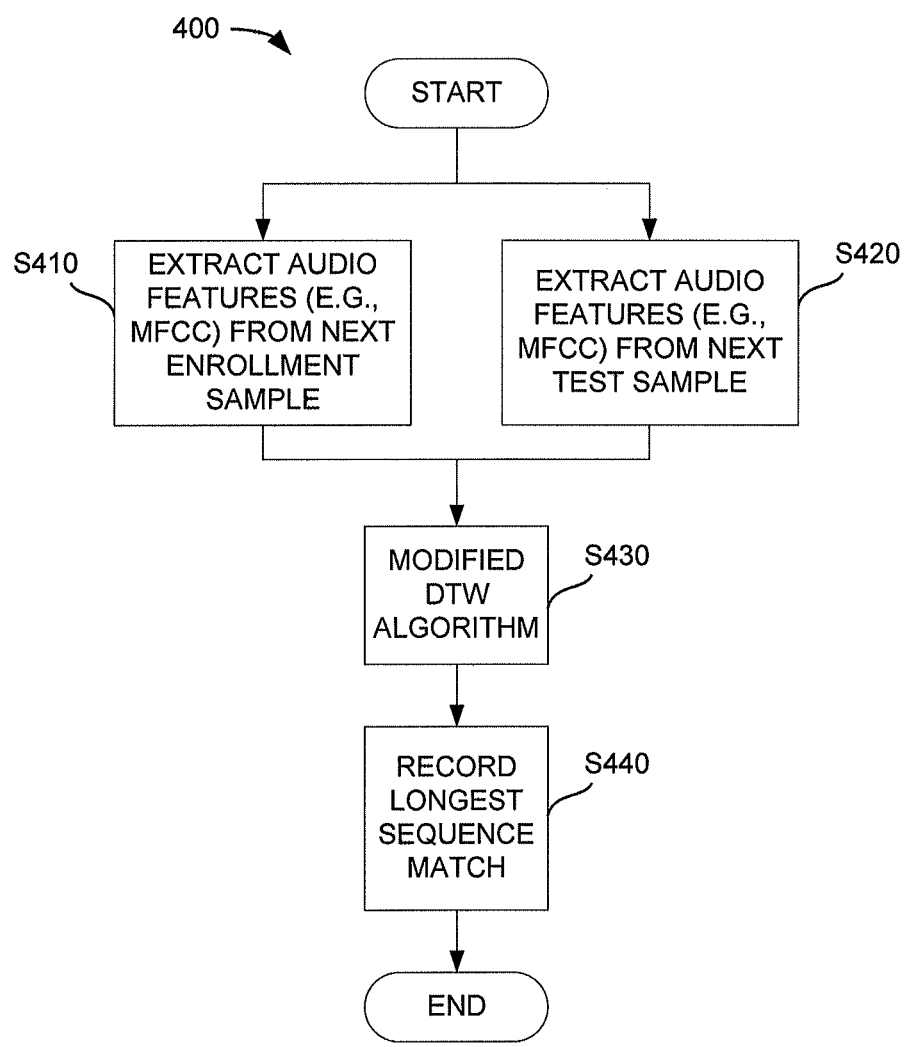
FIG. 4A is a flowchart showing a method for extracting and evaluating a partial sequence according to an exemplary embodiment herein disclosed.

FIG. 4A is a flowchart showing a method for extracting and evaluating a partial sequence according to an exemplary embodiment herein disclosed. First, the system extracts audio features (such as MFCC, LPCC, PLP, etc.) from a portion of both enrollment and test samples respectively at operations S410, S420. Although FIG. 4A shows operations S410 and S420 in parallel, it will be appreciated that they can be sequentially. It is noted that the portion from which features are extracted need not be (and typically is not) the entire conversation and can include, for example, a partial conversation. A modified DTW algorithm is performed (S430) that looks not only at the content similarity, but also on the acoustic similarity of the enrollment and test sequences. The system records (S440) the longest sequence match that defines the similarity between both utterances.

In general, dynamic time warping measures similarity between two temporal sequences (e.g., utterances) that may vary in speed. FIG. 4B shows a modified DTW algorithm 442 that may be utilized in the partial audio sequence matching disclosed herein, and which significantly reduces the complexity (and thus computation time) of a typical unmodified DTW technique, based on some assumptions. Specifically, DTW typically requires that both matching sequences start at the same time (t0) and finish at approximately the same time. In contrast, the modified DTW 442 does not require a common start and end time. The modified DTW algorithm 442 computes a similarity score between matrices. Specifically, in the algorithm 442 feature matrices U1 and U2 are, respectively, an enrollment utterance and a test utterance. Lengths of the respective utterances are denoted as d1 and d2. A time unit for d1, d2 typically represents a duration of 10 milliseconds, corresponding to the hop size at which feature vectors (e.g., MFCCs) are extracted. Thr is a cut-off threshold for deciding not to pursue the search with a path (e.g. Thr=0.6). $T_h$ is the horizontal step size (e.g. $T_h$=10).

For instance, in the case of passive recognition, a fraudster may be identified not only by his voice, but also by the fraudster's repetition of specific expected words or phrases. For example, the call center of a financial institution may request a caller to repeat certain information during each call, such as a name, account number, address, or the like. Even if the fraudster has the correct information, her voice, phone, or other channel characteristics may be evaluated to identify differences from expectations.

This technique coupled with a traditional text-independent speaker recognition system such as i-vectors provides very high recognition accuracy.

II. Widely Distributed Privacy Preserving UBM Training

A conventional speaker recognition system typically uses several universal background models (UBMs). These models account for a distribution of the training data in a hope that this distribution matches the distribution of all anticipated test data. The accuracy of such system can be good when care is taken in selecting training data. However, in practice, a data mismatch is common between UBM training and its end use in testing incoming callers in every call center. In some cases, the mismatch may be due to differences in the language used (e.g. training data=English, test data=Spanish), the accent (e.g. training data=Native English, test data=Non-Native English), and/or the channel (e.g., training data=Landline telephony, test data=VoIP telephony). Such mismatches reduce the quality of speaker recognition.

In some instances domain adaptation may be used to customize the UBM for a particular domain via unsupervised approaches like hierarchical clustering or whitening.

(See, e.g., Khoury, E., et al., "Hierarchical Speaker Clustering Methods for the NIST i-vector Challenge", Odyssey, 2014; and Garcia-Romero, D., et al., "Unsupervised Domain Adaptation for i-Vector Speaker Recognition". Odyssey, 2014.) However, while improvement was shown using these domain customized UBM techniques, the resulting voiceprints are limited to the corresponding domain, and typically cannot be applied to other domains. For instance, these approaches generally prevent the voiceprint extracted at Call Center A from being usefully implemented at call center B, making the detection of a particular fraudster across call centers impossible.

Obtaining the data necessary to train a UBM matched to a wide variety of call centers is prohibitive for several reasons, including the sensitivity of the call recordings which may contain Personally-Identifying Information (PII), payment card information, health information, and/or other sensitive data. Call centers may not be willing to let this data leave their premise, and even derived data used to train a UBM (such as MFCCs) may retain enough information to reconstruct the sensitive details of the recordings. The inventors have recognized a need for training a UBM appropriate for use in multiple domains, using data from a plurality of distributed participants, none of whom are willing to allow the training audio, or time-series data derived from the audio, to leave their control.

Successful learning techniques of the UBM include the use of an expectation-maximization (EM) algorithm, which aims to compute the parameters of the model such that the likelihood of those parameters is maximized over the training data. In the context of speaker recognition, techniques such as K-Means, Gaussian Mixture Model (GMM), and i-vectors each use the EM algorithm. This method includes accumulating the statistics (of a type depending on technique) of audio features with regards to the estimated model during the Expectation step. Then, those statistics are used to update the parameters of the model during the Maximization step. The process is done in an iterative manner until convergence, when the overall likelihood asymptotically reaches its maximum, or a maximum number of iterations is met.

Typically, the Expectation operation of an EM algorithm requires the use of audio features (e.g., MFCCs) to compute the accumulated statistics. The audio features are considered as sensitive data because it is possible to reverse engineering them, and thus generate the original speech signal. However, the accumulated statistics do not contain PII or other sensitive data, as the statistics are accumulated over several recordings from several speakers. Accordingly, the inventors here have devised a method for performing an EM algorithm in a distributed manner that preserves privacy.

Figure 5A:
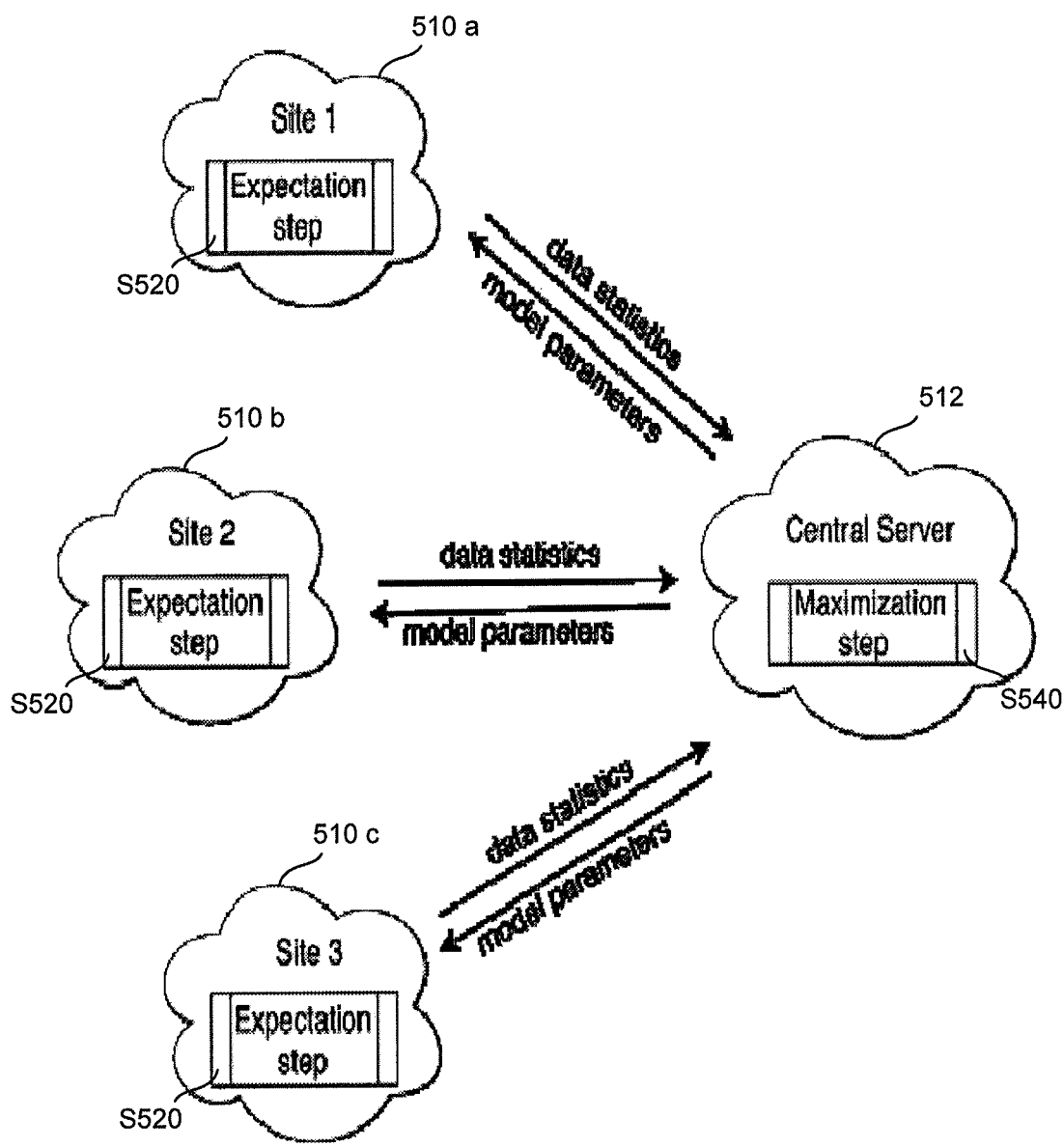
FIG. 5A is a block diagram showing a distribution of calculation according to an exemplary embodiment disclosed herein.

FIG. 5A is a block diagram 500 showing the distribution of EM algorithm to different locations preserving private information. In order to further preserve the privacy of data at each site, portions of the Expectation step S520 may be performed at the respective participant sites 510a-c, and then transfer the accumulated statistics to a central remote place, e.g., a Central Server 512, where the Maximization operation S540 is performed on the aggregate accumulated statistics.

Figure 5B:
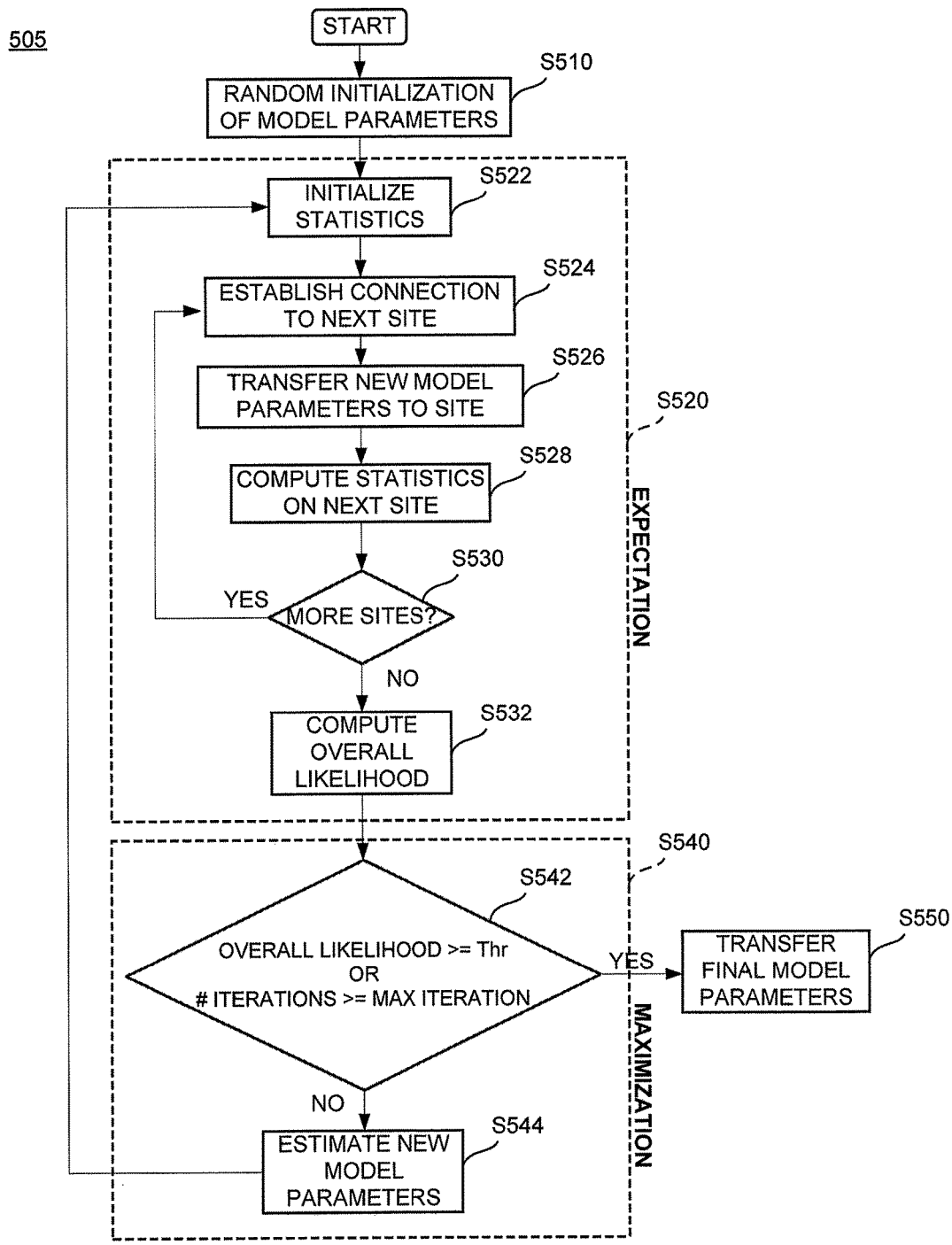
FIG. 5B is a flow chart illustrating a method for privacy preserving UBM training according to an exemplary embodiment disclosed herein.

FIG. 5B is a flow chart illustrating the method 505 for privacy preserving UBM training performed, in one non-limiting example, at a central server (580 in FIG. 5B). In operation S510, model parameters are initialized to semi-random states. An Expectation operation S520 is then performed, followed by Maximization operation S540. The Expectation operation S520 includes several sub-operations.

In operation S522, statistics are initialized. In operation S524, connection is established with an initial or next site (e.g., one of the participant sites 570a-c in FIG. 5B). In operation S526 new model parameters (established in operation S510) are transferred to the connected next site. In operation S528, statistics are computed on-site (i.e., at the subject participant site). If another participate site is to be included in the expectation operation S520, operations S524 through S528 are repeated (see S530). In operation S532 the overall likelihood is computed. In the maximization operation S540, the computed overall likelihood is compared with a threshold likelihood, Thr. If the likelihood satisfies the threshold, the final model parameters are transferred (S550) to all of the participant sites 570a-c. Otherwise, new model parameters are estimated (S544) and the expectation step S520 is repeated presented using the new model parameters.

Other than preserving the privacy of the participants, the disclosed technique benefits from a low data transfer requirements, since the size of the accumulated statistics is much smaller than audio files and even the derived spectral or phonetic features.

To ensure the portability of voiceprints and at the same time reduce domain mismatch, embodiments disclosed herein include a widely distributed UBM training across call centers. This training is done in a privacy preserving fashion that does not require transfer of any sensitive data outside the call center (or analogous institution).

III. Agent vs. Caller Identification

Another problem seen at many call centers involves inability to identify multiple callers in a same call. Most call center interactions include at least two actors: a call-center agent and a caller. At least for storage efficiency purposes, recordings of audio calls are often compressed in a mono-channel format that includes the entire conversation rather than recording each call participant in a distinct audio channel (e.g., stereo). However, this practice makes difficult the later use of the audio recording for analysis and information retrieval because retrieving "who spoke and when?" is not straightforward.

Conventional speaker diarization techniques partially answer the question of "when" by segmenting a mono-channel audio recording into homogeneous audio turns (e.g., agent's turn, caller's turn) and then separating those turns into respective clusters (e.g., C1 and C2), where one cluster ideally corresponds to the agent and the other cluster to the caller. However, speaker diarization merely notes a change of call participant—it does not identify the participants respectively associated with the first and second clusters.

Another conventional approach combines automatic speech recognition (ASR), speaker diarization and named entity recognition in order to recognize respective speakers. (See Khoury, et al., "Combining Transcription-based and Acoustic-based Speaker Identifications for Broadcast News", ICASSP, 2012.) However, that system requires a supervised training algorithm with multiple speakers, is based on a Gaussian Mixture Model-Hidden Markov Model (GMM-HMM), the diarization part is based on Bayesian information criterion (BIC) segmentation and clustering followed by cross-likelihood ration (CLR) clustering, and uses belief functions.

The inventors have recognized a different approach for identifying speakers associated with particular turns of conversation that improves the recognition accuracy of Caller identification and Agent identification. For instance, this is very important in cases where it is desirable to discard portions of the call in which an agent is speaking in order to better assess fraud detection on the portion of the call when the Caller is speaking. Specifically, the present disclosure describes embodiments that solve this problem by combining speaker diarization with automatic speech recognition and evaluates the progress of the call and the turn of phrases using a probabilistic model, such as a Bayesian network or a Hidden Markov Model.

Figure 6:
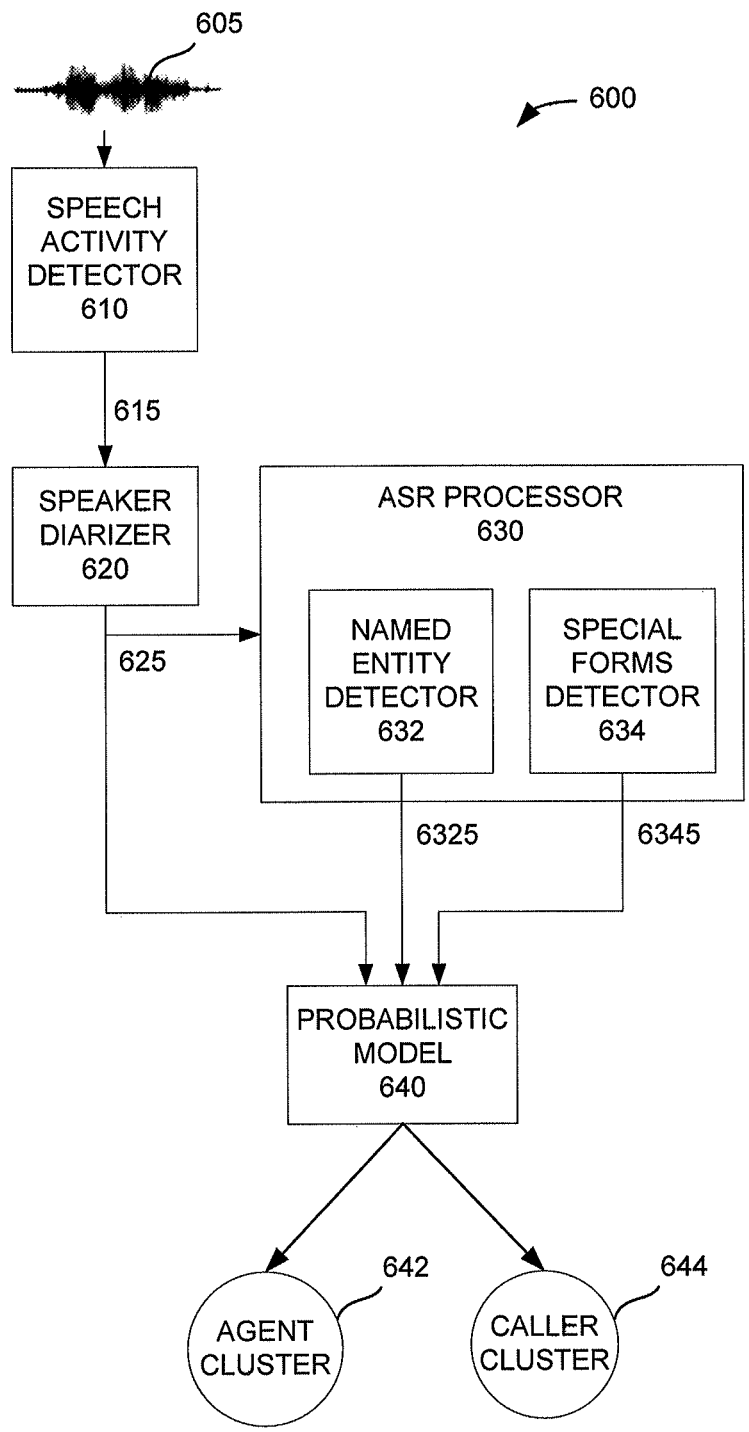
FIG. 6 is a block diagram illustrating an architecture for agent vs. caller identification.

FIG. 6 is a block diagram illustrating an architecture 600 for agent vs. caller identification. According to some embodiments, a GMM-based speech activity detector (SAD) 610 is first applied to an input speech signal 605 to discard the non-speech part. This is followed by speaker diarization processor 620 that operates on the remaining speech portion 615 received from the SAD 610. The speaker diarization processor 620 may operate to create a plurality of clusters 625 respectively associated with number of speakers in the remaining speech portion 615 based on a partitional clustering of i-vectors extracted periodically (e.g., every 2 seconds where the number of clusters is set to 2). After diarization, an automatic speech recognition (ASR) processor 630 recognizes the text content of the speech in each of the clusters 625 generated by the speaker diarization processor 620. The ASR processor 630 may implement, for example, a deep neural network (DNN) to effect a named entity detector 632 and a special forms detector 634. The named entity detector 632 may extract an entity name 6325, such as a first and/or last name, name of an institution, etc. The special forms extractor 634 may extract a word or phrase (special form) 6345 associated as a prompt or trigger associated with the entity name 6325. For example, the special form 6345 may be one of a set of special forms (e.g. "My name is" or "what's your name") each associated with a prior probability that the current, next or previous utterance being spoken by the caller or the agent is an entity name 6325. In some embodiments, the ASR processor 630 may create a transcript of all the speech in the clusters 625, and the named entity detector 632 and special forms detector 634 may operate to identify the entity name 6325 and/or special form 6345 in the transcript. Once the clusters 625, named entity 6325 and special forms 6345 are available, a probabilistic model 640 such as a Bayesian network or Hidden Markov Model can be trained. The trained probabilistic model 640 outputs the clusters in association with an identity of a corresponding speaker. For example, a cluster 642 may be associated specifically with an agent and another cluster 644 may be associated with a caller based on the probabilistic model 640.

Figure 7:
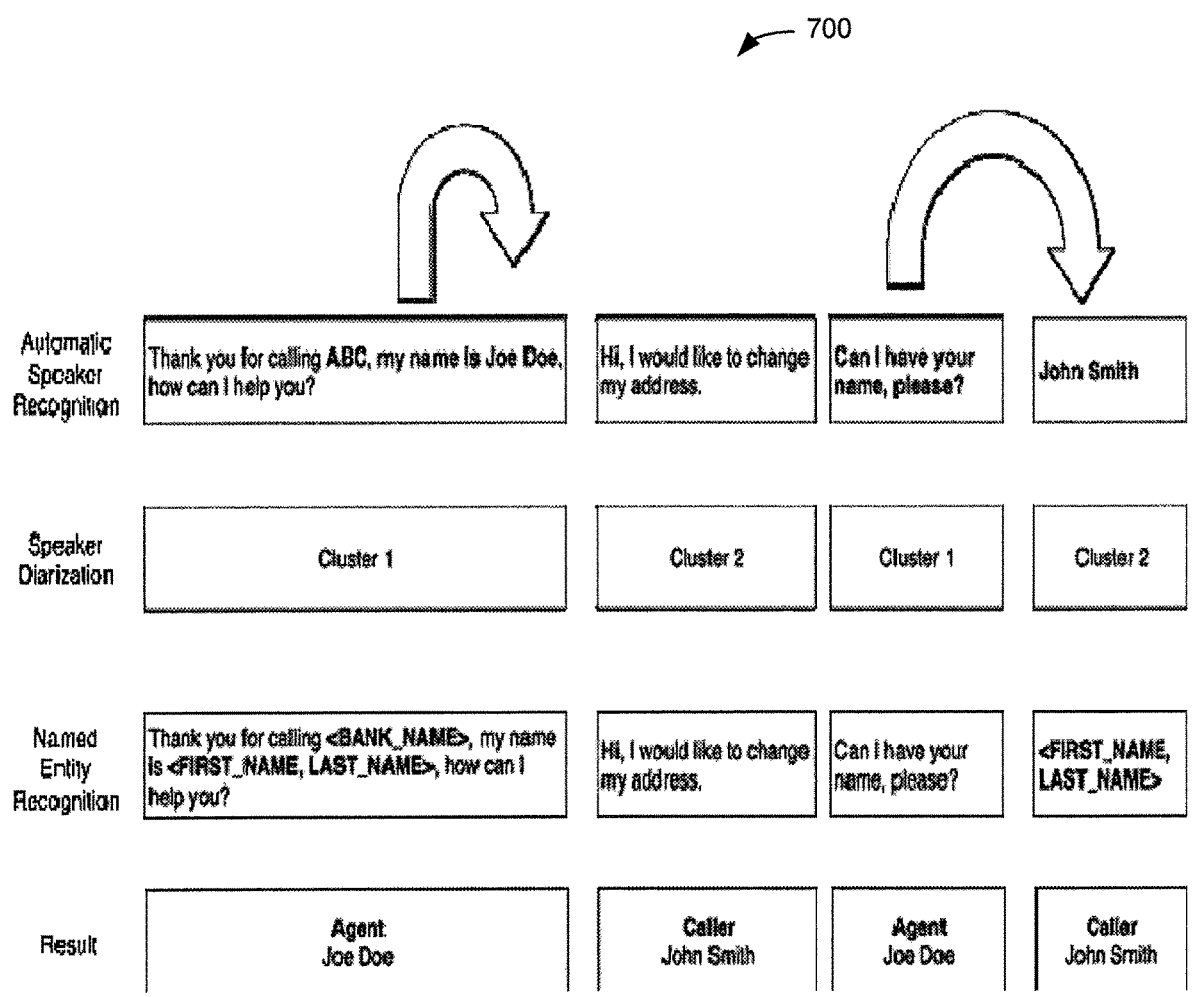
FIG. 7 is a partial flow diagram 700 illustrating an example of agent vs. caller identification according to an exemplary embodiment disclosed herein.

FIG. 7 is a partial flow diagram 700 illustrating an example of agent vs. caller identification. In the first row, the text "my name is" is recognized by the ASR (e.g., 630) as a special form 6345, indicating with high probability that the next utterance, "Joe Doe" is an entity name 6325. Likewise, the phrase "Can I have your name, please?" is identified as a special form 6345 with a high probability that the response "John Smith", from a different speaker, is likely to be an entity name 6325. It may also be seen that the text "Thank you for calling" is a special form suggesting that the next utterance, "ABC" is an entity name. In the second row, speaker diarization is illustrated, breaking down the text from the ASR 630 into clusters associated with different speakers. For example, the first and third speaking "turns" are identified as being from a same speaker and are associated with cluster 1, whereas the second and fourth speaking turns are identified as being from a different speaker and are associated with cluster 2.

In some embodiments, the agent vs. caller identification may focus on identifying just the caller, once diarization is complete, as the agent may be known and readily identified using other data. In such case, the system may be configured to quickly verify the agents' already known identity against samples of a particular cluster, so that focus may be placed on identifying the caller associated with a different cluster. However, in practice it has been noted that, while the agent is often the speaker who speaks first, this is not an assumption that be relied upon. Sometimes the caller is talking before the agent (for example, if the call is carried on from IVR, speaking to check if the agent is hearing/available). Add to this the errors that can occur in speaker diarization, which sometimes mistakenly associate the first few seconds of speech with the caller cluster instead of the agent cluster.

IV. Large-Scale Speaker Identification

Speaker identification is a 1:N problem (i.e., matching a speaker to one of a number N of voiceprints). If N is small (typically <1000), a linear search for the best match is affordable. However, speaker identification does not scale well to large numbers of enrolled speakers (e.g., N>1000), primarily due to the cost of computing similarity between the probe and a large number of speaker models. Specifically, if N becomes very large (e.g. sometimes exceeding tens of millions of customers for large financial institutions), a linear search becomes too costly. Thus, a solution is needed for reducing the time and/or computation necessary for identifying the speaker. One conventional approach involves applying i-vectors with a cosine-based similarity metric, and locality sensitive hashing (LHS) for fast nearest neighbor search in high dimensional space. (See Schmidt, et al. "Large-scale speaker identification." ICASSP, 2014.) Another approach applies non-parametric hashing approaches. (See Sturim, D., et al., "Speaker Linking and Applications Using Non-Parametric Hashing Methods", Interspeech, 2016.)

I-vectors exhibit strong locality, as evidenced by success of simple similarity metrics (e.g. cosine) as classifiers. Therefore, locality of i-vectors may be exploited to coarsely prune the speaker model search space before executing more precise (and expensive) computations. This first step is achieved by treating speaker identification as an information retrieval problem.

Approximate Nearest Neighbor algorithms are one class of information retrieval algorithms that can be applied in this way. Spectral hashing and its extension, multi-dimensional spectral hashing, are two such Approximate Nearest Neighbor algorithms that are suitable for i-vector search space reduction.

Figure 8A:
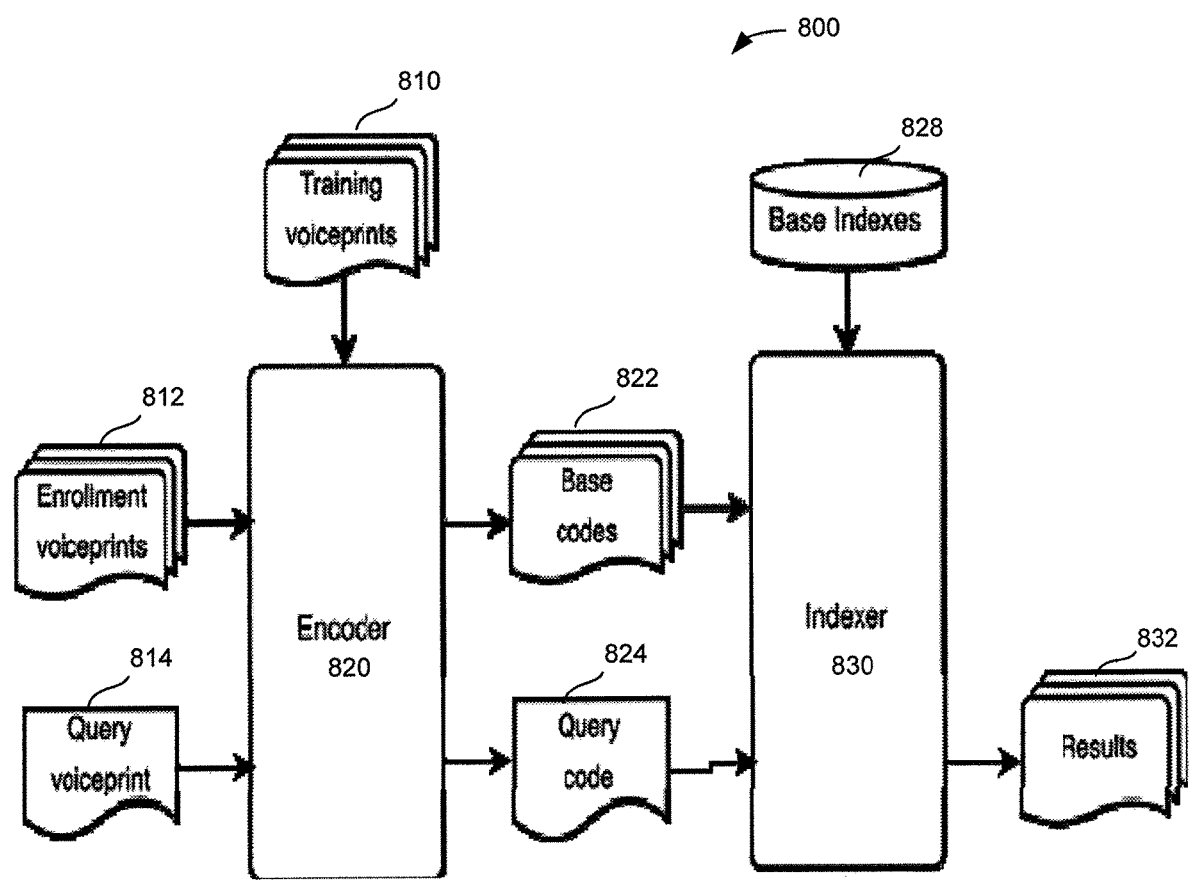
FIG. 8A is a block diagram illustrating a pipeline for training (encoding and indexing) and testing according to an exemplary embodiment disclosed herein.

FIG. 8A is a block diagram illustrating an exemplary pipeline 800 for training (encoding and indexing) and testing. For the spectral hashing algorithm, a small set of i-vectors are used to train an encoder 820 that produces similar binary codes (e.g., base codes 822) for similar i-vectors. This encoder 820 is used together with an indexer 830 to index a larger set of i-vectors (e.g., training voiceprints 810), such that the index can be efficiently searched for the top K most similar i-vectors (typically enrollment voiceprints 812) to a particular test i-vector (query voiceprint 814). These K i-vectors are each verified (or eliminated) using a more precise (and expensive) technique, such as PLDA, SVM, and other classifiers. K is chosen to maximize recall of matching speaker i-vectors (e.g., enrollment voiceprints 812) while maintaining a reasonable bound on the cost of the more precise search. While the inventors developed this method using i-vectors, it is recognized that the method is applicable to any speaker-dependent feature vector that exhibits strong locality.

Figure 8B:
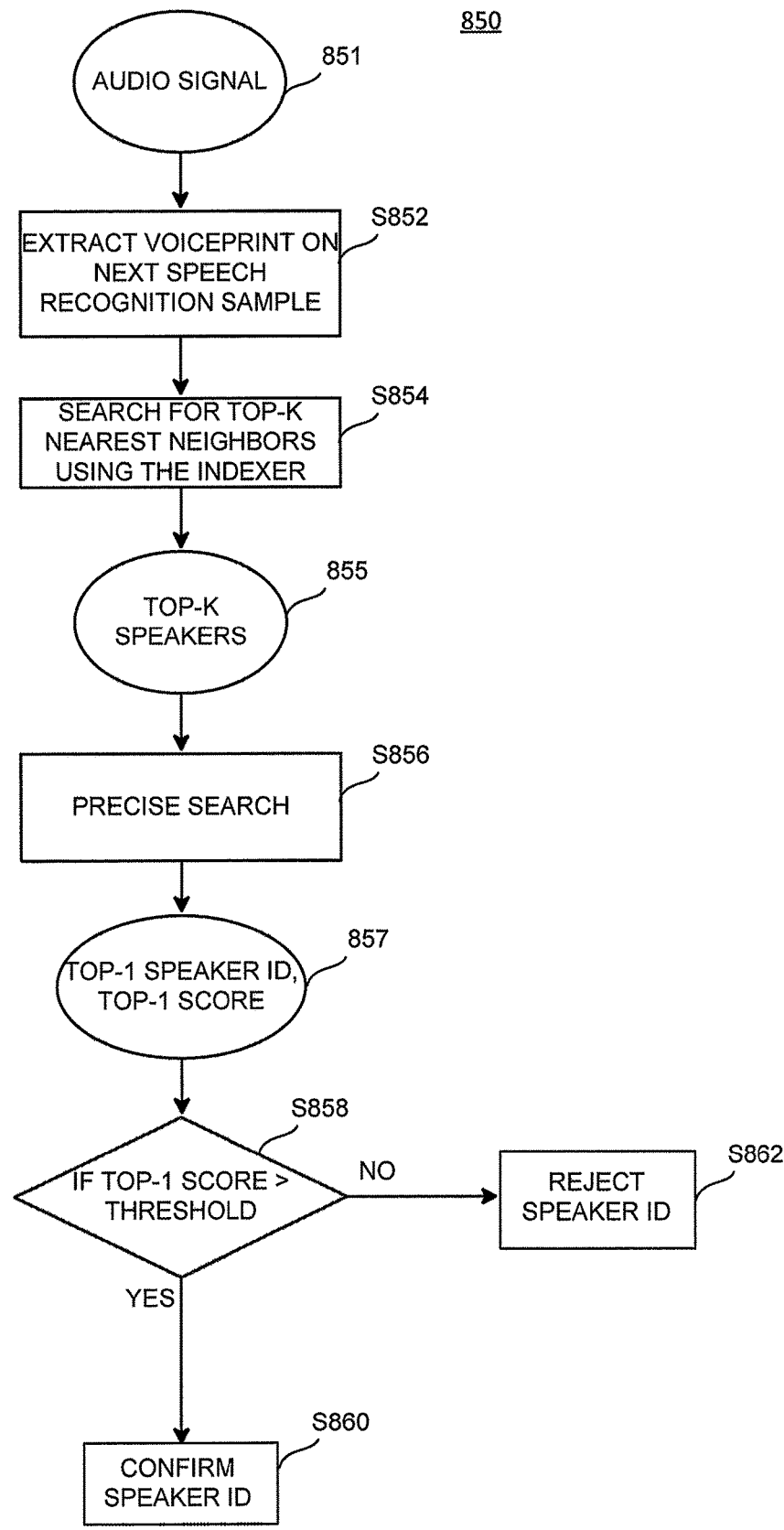
FIG. 8B is a flowchart illustrating a training and testing process corresponding to the pipeline in FIG. 8A, according to an exemplary embodiment disclosed herein.

FIG. 8B is a flowchart illustrating a training and testing process 850 corresponding to the pipeline 800 described above. In operation S852 a voiceprint is extracted from a speech recognition sample of audio signal 851. In operation S854, the indexer (830 in FIG. 8A) searches for the top K nearest neighbors. The result of that search identifies the top K speakers 855. In operation S856, a precise search is performed to identify the best (top-1) speaker similarity, i.e., identifying the best matched speaker 857, as well as producing a similarity score for the identified top-1 speaker. The precise search algorithm will loop over all top-K nearest neighbors, and compute the similarity score between the test voiceprint and those neighbors. It will sort the neighbors according to the computed similarities. The neighbor with the highest similarity will be the top-1 speaker. The similarity score could be computed using PLDA, Cosine similarity or SVM. The similarity score for the top one speaker is evaluated against a predetermined threshold (S858), and if the threshold is satisfied the speaker identification is confirmed (S860). Otherwise, the speaker identity is rejected (S862).

Spectral Hashing (SH) outperforms other approaches such as LSH or Non-parametric hashing approaches, the only approaches conventionally used for speaker recognition. The inventors have also found that a Product Quantization (PQ) approach may be implemented for accuracy similar to SH, but with faster performance at indexing and test times. It will be recognized that FIG. 8A is applicable to both approaches.

V. Fraud Call Detection by Voiceprint Anomaly

Call centers, for example of financial institutions, regularly receive fraudulent calls, where a fraudulent caller impersonates a genuine caller, e.g., an account holder, for illicit purposes. When applying speaker recognition in a call center, it is possible to benefit from some cues to improve the accuracy of speaker recognition. For example, the call center may use speaker recognition system to verify the caller and may pair this verification with other information such as an ANI, expected channel or phone characteristics, or the like to detect an anomaly in the call.

Figure 9A:
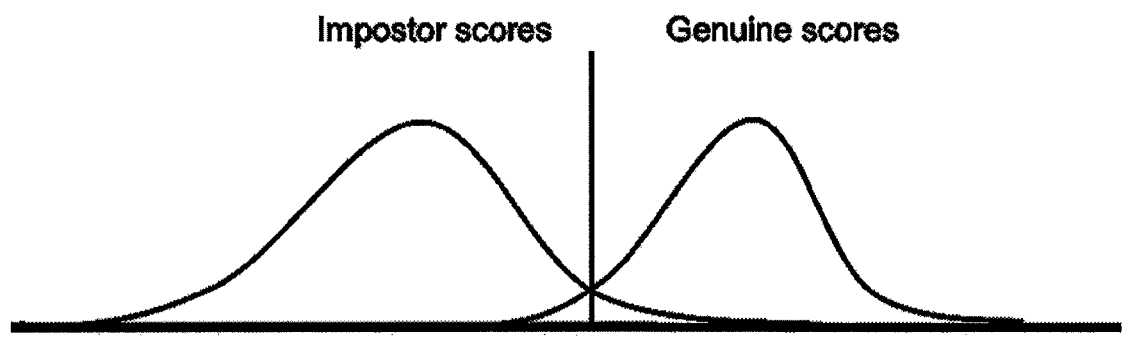
FIGS. 9A-9C illustrate score distributions for anomalous calls in a call center according to exemplary embodiments disclosed herein.

Beyond verification or identification scenario, voiceprints can be used for anomaly detection, and this technique can be applied to detect first-occurring fraud activity. In a call center, it is very common that two calls that have the same phone number come from same speakers ("Genuine scores" curve in FIG. 9A), and conversely two calls coming from two different phone numbers correspond to different speakers ("Imposer scores" curve in FIG. 9A). Additionally, it is very uncommon that typical genuine callers call their bank very often (e.g. some fraudsters call the bank more than 200 times in less than a week). These assumptions may be considered to be the "normal" condition. Thus if this normal condition is not met, an anomaly is probably occurring.

Such anomalies may be detected by a speaker recognition system. Specifically, a speaker may be verified or identified based in part on the ANI of the caller.

For example, enrolled voiceprints may be indexed to one or more ANIs. Thus, when the voiceprint and/or associated ANI of a caller does not match an enrolled voiceprint and/or associated ANI, the likelihood that the caller is potential fraudsters. That is, if the caller's voiceprint (a) cannot be verified, (b) does not match the voiceprint associated with caller's ANI, (c) can be verified but does not match the indexed ANI associated with the voiceprint, or (d) has been identified more than a predetermined threshold number in a particular period of time, the call center may implement additional measures to determine authenticity of the call or may deny service. This technique could be very important to detect a first occurrence of fraud activity.

Figure 9B:
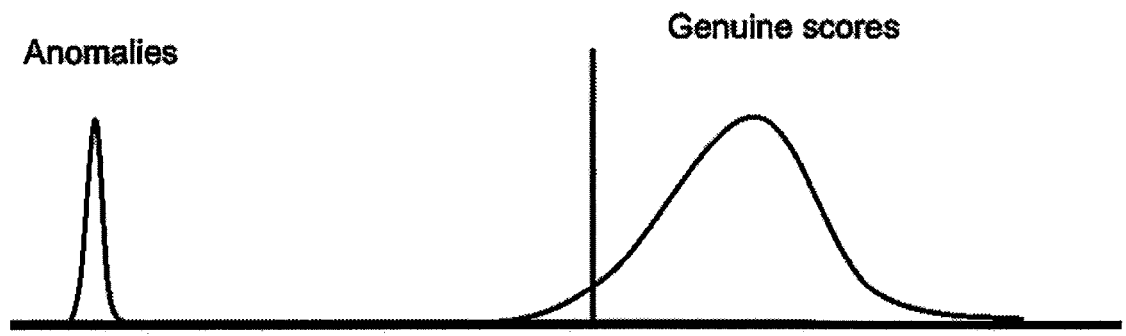
Figure 9C:
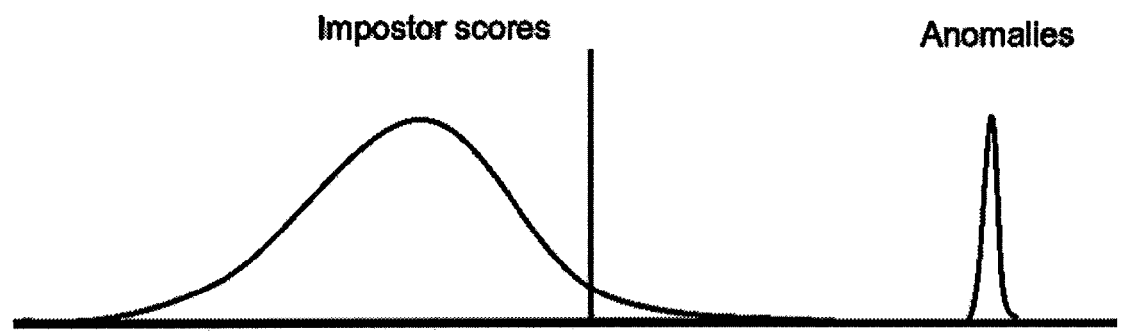

Practically, a voiceprint anomaly is detected if:
the matching score between a call and the model of its phone number (false negative matches) is very low compared to the normal distribution of true positive matches (FIG. 9B), or
the matching score between a call and the model of a different phone number is very high compared to the normal distribution of true negative matches (FIG. 9C).

In the preceding detailed description, various specific details are set forth in order to provide an understanding of improvements for speaker recognition in a call center, and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present invention and particularly the speaker recognition subsystem 20 generally relates to an apparatus for performing the operations described herein. This apparatus may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a computer readable storage medium, such as, but is not limited to, any type of disk including optical disks, CD-ROMs, magneto-optical disks, read-only memories (ROMs), random access memories (RAMs), EPROMs, EEPROMs, magnetic or optical cards, integrated memory, "cloud" storage, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method comprising:
   extracting, by a computer, a first set of audio features from a first audio signal containing a first utterance according to a speaker diarization algorithm, the first audio signal received from an enrollee electronic device;
   extracting, by the computer, a second set of audio features from a second audio signal containing a second utterance according to the speaker diarization algorithm, the second audio signal received from a caller electronic device;
   performing, by the computer, a phonetic and acoustic comparison of the first utterance and the second utterance based upon the first set of audio features and the second set of audio features; and
   determining, by the computer based upon the phonetic and acoustic comparison, at least a partial keyword sequence match and a speaker match between the first utterance and the second utterance.

2. The computer-implemented method of claim 1, wherein the first set of audio features and the second set of audio features comprise at least one of mel-frequency cepstral coefficients (MFCCs), linear predictive cepstral coefficients (LPCCs), or perceptual linear prediction (PLP).

3. The computer-implemented method of claim 1, wherein the step of performing the phonetic and acoustic comparison further comprises:
   executing, by the computer, a modified dynamic time warping process on at least a portion of the first audio signal; and
   executing, by the computer, the modified dynamic time warping process on at least a portion of the second audio signal.

4. The computer-implemented method of claim 3, further comprising:
 time hopping, by the computer, on the portion of the first audio signal during the modified dynamic time warping process based upon a first hop size of the first set of audio features; and
 time hopping, by the computer, on the portion of the second audio signal during the modified dynamic time warping process based upon a second hop size of the second set of audio features.

5. The computer-implemented method of claim 4, wherein the partial keyword sequence match includes a first set of one or more keywords in the first utterance and a second set of one or more keywords in the second utterance, the first set of one or more keywords being the same as the second set of one or more keywords.

6. The computer-implemented method of claim 5, wherein the first set of one or more keywords in the first utterance begins at a different time than the second set of one or more keywords in the second utterance.

7. The computer-implemented method of claim 1, wherein the first audio signal is an enrollment sample.

8. The computer-implemented method of claim 1, wherein the second audio signal is a test sample.

9. The computer-implemented method of claim 1, wherein the second utterance in the second audio signal is from a speaker to be identified.

10. The computer-implemented method of claim 9, further comprising:
 identifying, by the computer, the speaker based upon the partial keyword sequence match and the speaker match.

11. A system comprising:
 a non-transitory storage medium storing a plurality of computer program instructions; and
 a processor electrically coupled to the non-transitory storage medium and configured to execute the computer program instructions to:
  extract a first set of audio features from a first audio signal containing a first utterance according to a speaker diarization algorithm, the first audio signal received from an enrollee electronic device;
  extract a second set of audio features from a second audio signal containing a second utterance according to the speaker diarization algorithm, the second audio signal received from a caller electronic device;
  perform a phonetic and acoustic comparison of the first utterance and the second utterance based upon the first set of audio features and the second set of audio features; and
  determine based upon the phonetic and acoustic comparison, at least a partial keyword sequence match and a speaker match between the first utterance and the second utterance.

12. The system of claim 11, wherein the first set of audio features and the second set of audio features comprise at least one of mel-frequency cepstral coefficients (MFCCs), linear predictive cepstral coefficients (LPCCs), or perceptual linear prediction (PLP).

13. The system of claim 11, wherein the processor is configured to further execute the computer program instructions to:
 execute a modified dynamic time warping process on at least a portion of the first audio signal; and
 execute the modified dynamic time warping process on at least a portion of the second audio signal.

14. The system of claim 13, wherein the processor is configured to further execute the computer program instructions to:
 time hop on the portion of the first audio signal during the modified dynamic time warping process based upon a first hop size of the first set of audio features; and
 time hop on the portion of the second audio signal during the modified dynamic time warping process based upon a second hop size of the second set of audio features.

15. The system of claim 14, wherein the partial keyword sequence match includes a first set of one or more keywords in the first utterance and a second set of one or more keywords in the second utterance, the first set of one or more keywords being the same as the second set of one or more keywords.

16. The system of claim 15, wherein the first set of one or more keywords in the first utterance begins at a different time than the second set of one or more keywords in the second utterance.

17. The system of claim 11, wherein the first audio signal is an enrollment sample.

18. The system of claim 11, wherein the second audio signal is a test sample.

19. The system of claim 11, wherein the second utterance in the second audio signal is from a speaker to be identified.

20. The system of claim 19, wherein the processor is configured to further execute the computer program instructions to:
 identify the speaker based upon the partial keyword sequence match and the speaker match.

* * * * *